US008415587B2

(12) United States Patent
Millman, Jr. et al.

(10) Patent No.: US 8,415,587 B2
(45) Date of Patent: *Apr. 9, 2013

(54) FIBER-OPTIC BEAM DELIVERY SYSTEM FOR WAFER EDGE PROCESSING

(75) Inventors: Ronald P. Millman, Jr., Taunton, MA (US); Kenneth J. Harte, Carlisle, MA (US); Victoria M. Chaplick, Charlton, MA (US); David J. Elliott, Carlisle, MA (US)

(73) Assignee: UVTech Systems, Inc., Sudbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,202

(22) Filed: Feb. 24, 2011

(65) Prior Publication Data

US 2011/0139759 A1    Jun. 16, 2011

Related U.S. Application Data

(60) Provisional application No. 61/419,602, filed on Dec. 3, 2010.

(51) Int. Cl.
*B23K 26/00* (2006.01)

(52) U.S. Cl.
USPC ............ 219/121.72; 219/121.68; 219/121.69

(58) Field of Classification Search ............ 219/121.72, 219/121.68, 121.69, 121.84, 121.86, 121.76
See application file for complete search history.

(56) References Cited

U.S. PATENT DOCUMENTS

| | | | |
|---|---|---|---|
| 5,302,547 A | 4/1994 | Wojnarowski et al. | |
| 5,392,989 A | 2/1995 | Hurtig | |
| 6,406,589 B1 | 6/2002 | Yanagisawa | |
| 6,482,199 B1 * | 11/2002 | Neev | 606/10 |
| 6,495,312 B1 | 12/2002 | Young et al. | |
| 6,508,990 B1 | 1/2003 | Yoshida et al. | |
| 6,635,844 B2 * | 10/2003 | Yu | 219/121.68 |
| 6,676,878 B2 * | 1/2004 | O'Brien et al. | 264/400 |
| 6,874,510 B2 | 4/2005 | Reder et al. | |
| 6,881,687 B1 * | 4/2005 | Castrucci | 438/795 |

(Continued)

OTHER PUBLICATIONS

Rinnen, K., et al., "Forecast: Semiconductor Wafer Fab Equipment, Worldwide, 4Q07 Update," Gartner Dataquest, Gartner, Inc. Fab Database: Worldwide, 2009, 25 pages (2007).

(Continued)

*Primary Examiner* — Tu B Hoang
*Assistant Examiner* — Thien S Tran
(74) *Attorney, Agent, or Firm* — Cesari and McKenna, LLP

(57) ABSTRACT

A method and apparatus for processing substrate edges is disclosed that overcomes the limitations of conventional edge processing methods and systems used in semiconductor manufacturing. The edge processing method and apparatus of this invention includes a laser and fiber-optic system to direct laser radiation onto a rotating substrate supported by a chuck. A laser beam is transmitted into a bundle of optical fibers, and the fibers accurately and precisely direct the beam to remove or transform organic or inorganic films, film stacks, residues, or particles, in atmosphere, from the top edge, top bevel, apex, bottom bevel, and bottom edge of the substrate in a single process step. Reaction by-products are removed by means of an exhaust tube enveloping the reaction site. This invention permits precise control of an edge exclusion width, resulting in an increase in the number of usable die on a wafer. Wafer edge processing with this invention replaces existing methods that use large volumes of purified water and hazardous chemicals including solvents, acids, alkalis, and proprietary strippers.

19 Claims, 14 Drawing Sheets

U.S. PATENT DOCUMENTS

| | | | |
|---|---|---|---|
| 7,170,912 B2* | 1/2007 | Chen | 372/22 |
| 7,182,821 B2 | 2/2007 | Izumi et al. | |
| 7,267,726 B2 | 9/2007 | Xia | |
| 7,270,136 B2 | 9/2007 | Ko et al. | |
| 7,460,211 B2 | 12/2008 | Whitefield et al. | |
| 7,528,342 B2 | 5/2009 | Deshi | |
| 7,651,585 B2 | 1/2010 | Yoon et al. | |
| 7,745,095 B2 | 6/2010 | Wong et al. | |
| 2003/0154001 A1 | 8/2003 | Oh | |
| 2004/0126923 A1 | 7/2004 | Benson | |
| 2006/0278254 A1 | 12/2006 | Jackson | |
| 2007/0093067 A1 | 4/2007 | Chang et al. | |
| 2007/0138151 A1 | 6/2007 | Tanaka et al. | |
| 2007/0176084 A1 | 8/2007 | Shyu et al. | |
| 2008/0010845 A1* | 1/2008 | Bailey et al. | 33/520 |
| 2008/0073324 A1* | 3/2008 | Nogami et al. | 216/58 |
| 2008/0277061 A1 | 11/2008 | Kobayashi et al. | |
| 2008/0289651 A1 | 11/2008 | Cheng et al. | |
| 2008/0314879 A1 | 12/2008 | Bruland et al. | |
| 2009/0029629 A1 | 1/2009 | Shin et al. | |
| 2009/0038637 A1 | 2/2009 | LeClaire et al. | |
| 2009/0044831 A1 | 2/2009 | Yudovsky et al. | |
| 2010/0051073 A1 | 3/2010 | Iwase et al. | |
| 2010/0099265 A1 | 4/2010 | Yoon et al. | |
| 2010/0147327 A1 | 6/2010 | Kondo et al. | |
| 2010/0190416 A1 | 7/2010 | Schwarzenbach et al. | |
| 2010/0285399 A1 | 11/2010 | Huang et al. | |

OTHER PUBLICATIONS

Singer, P., et al., "How Green is Your Valley," Solid State Technology, Editorial, Mar. 2009.

Handbook of Semiconductor Cleaning Technology, Ed. Werner Kern, ISBN 0-8155-1331-3, p. 20 (1993).

International Search Report and Written Opinion of PCT/US11/62832 dated Jan. 24, 2012.

International Search Report from PCT/US11/00036 dated Dec. 19, 2011.

* cited by examiner

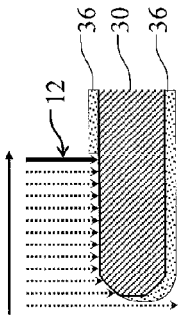
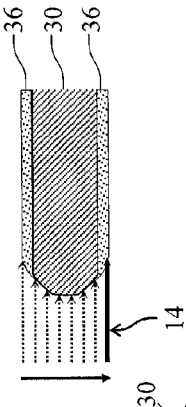
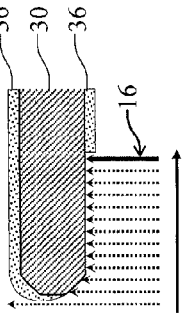
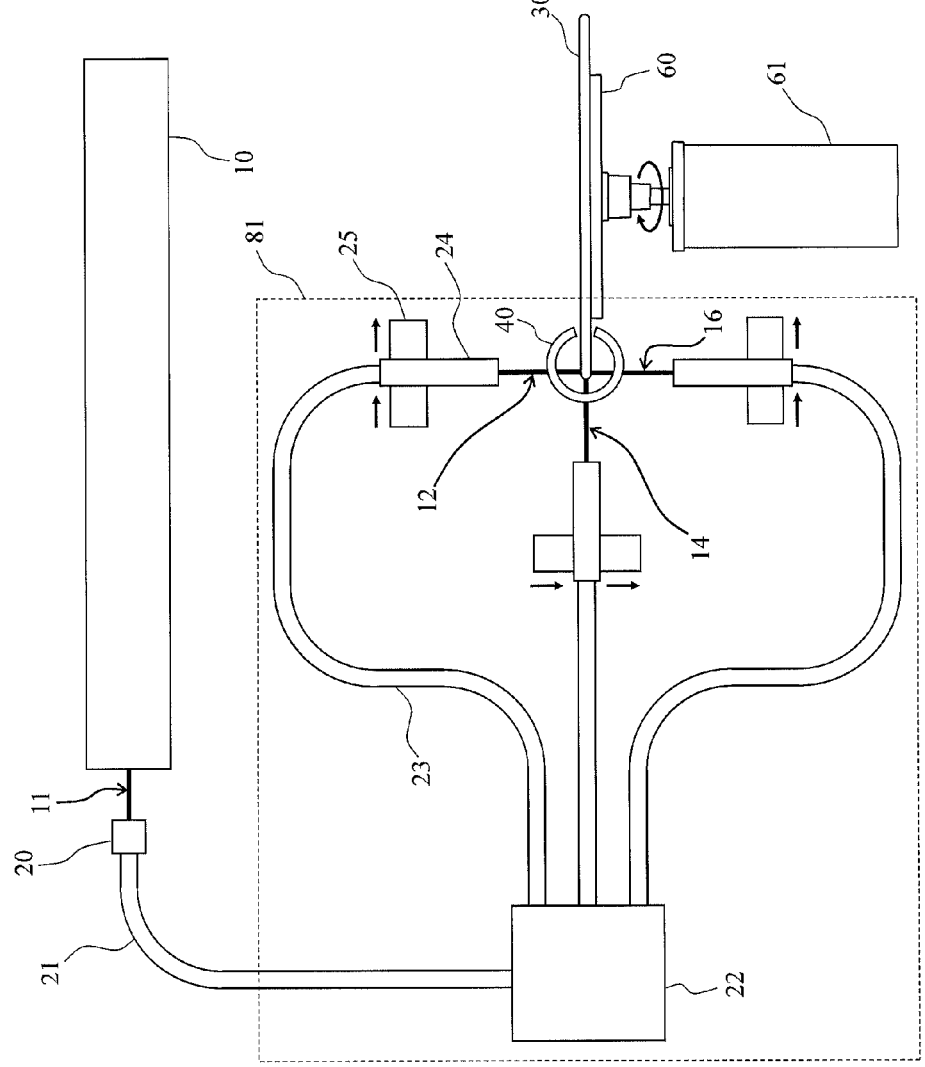

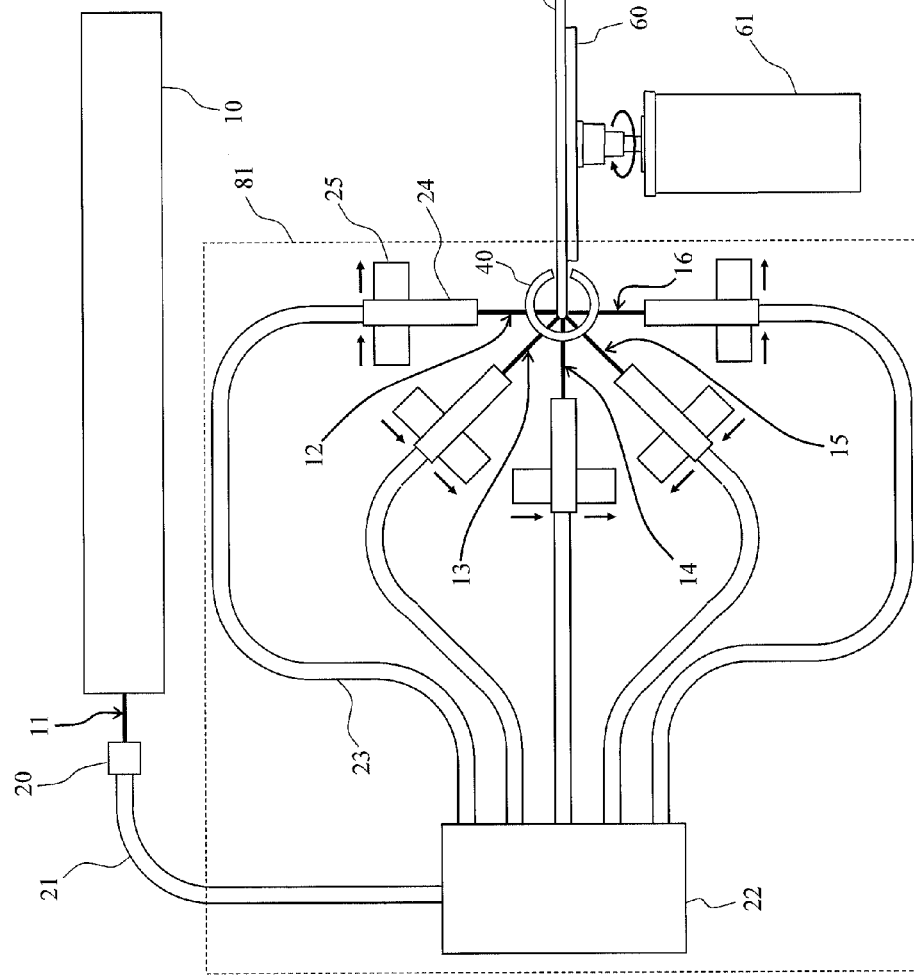

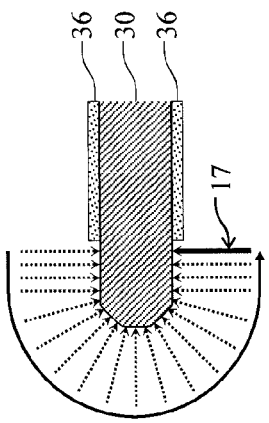
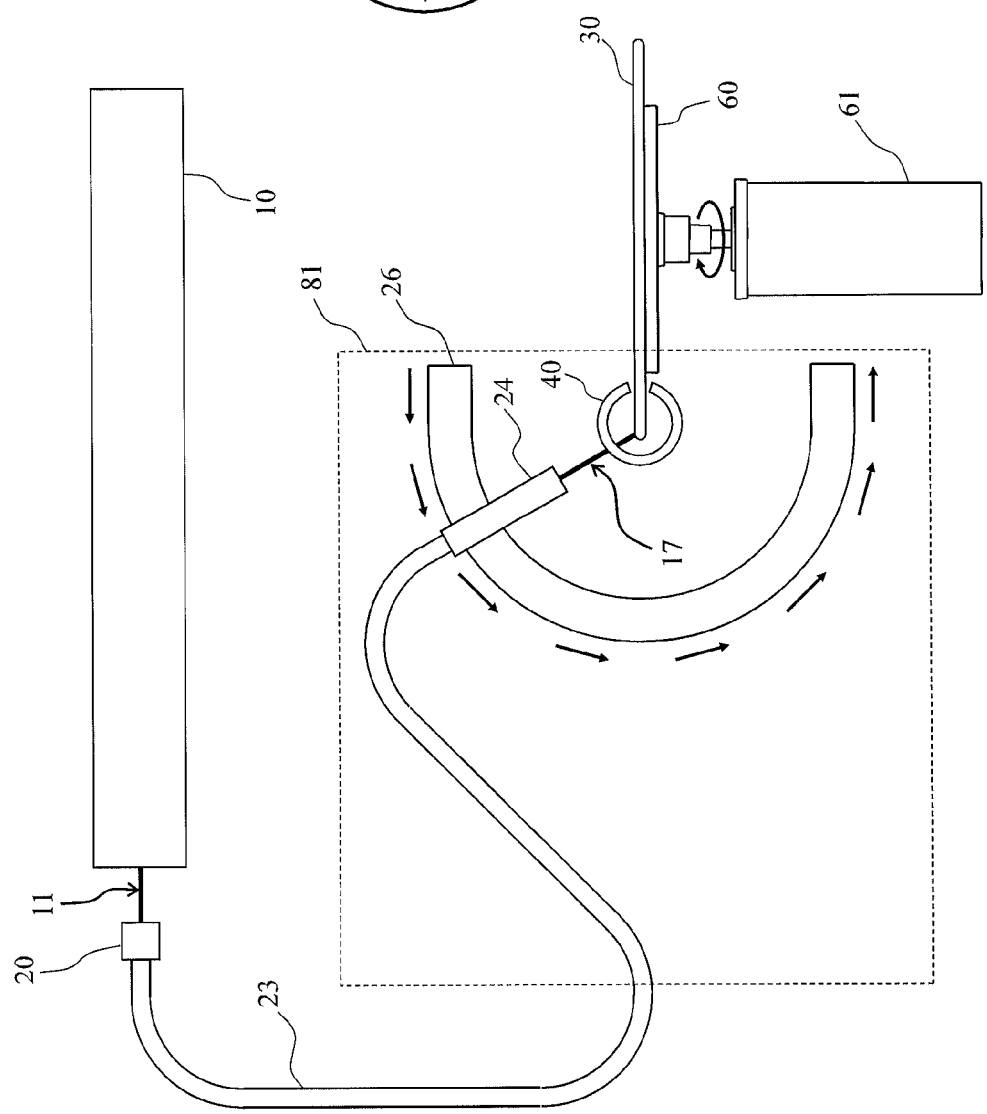

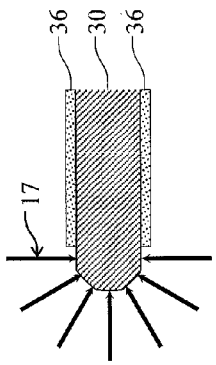
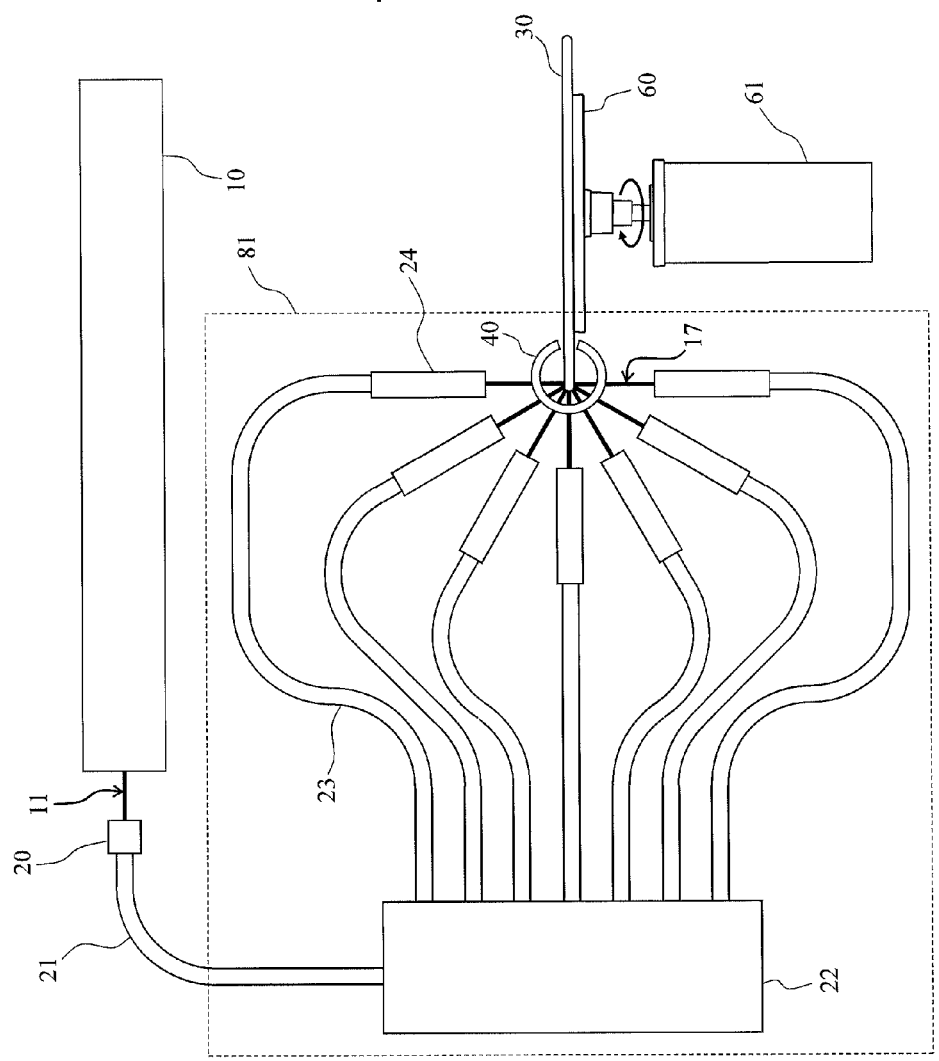

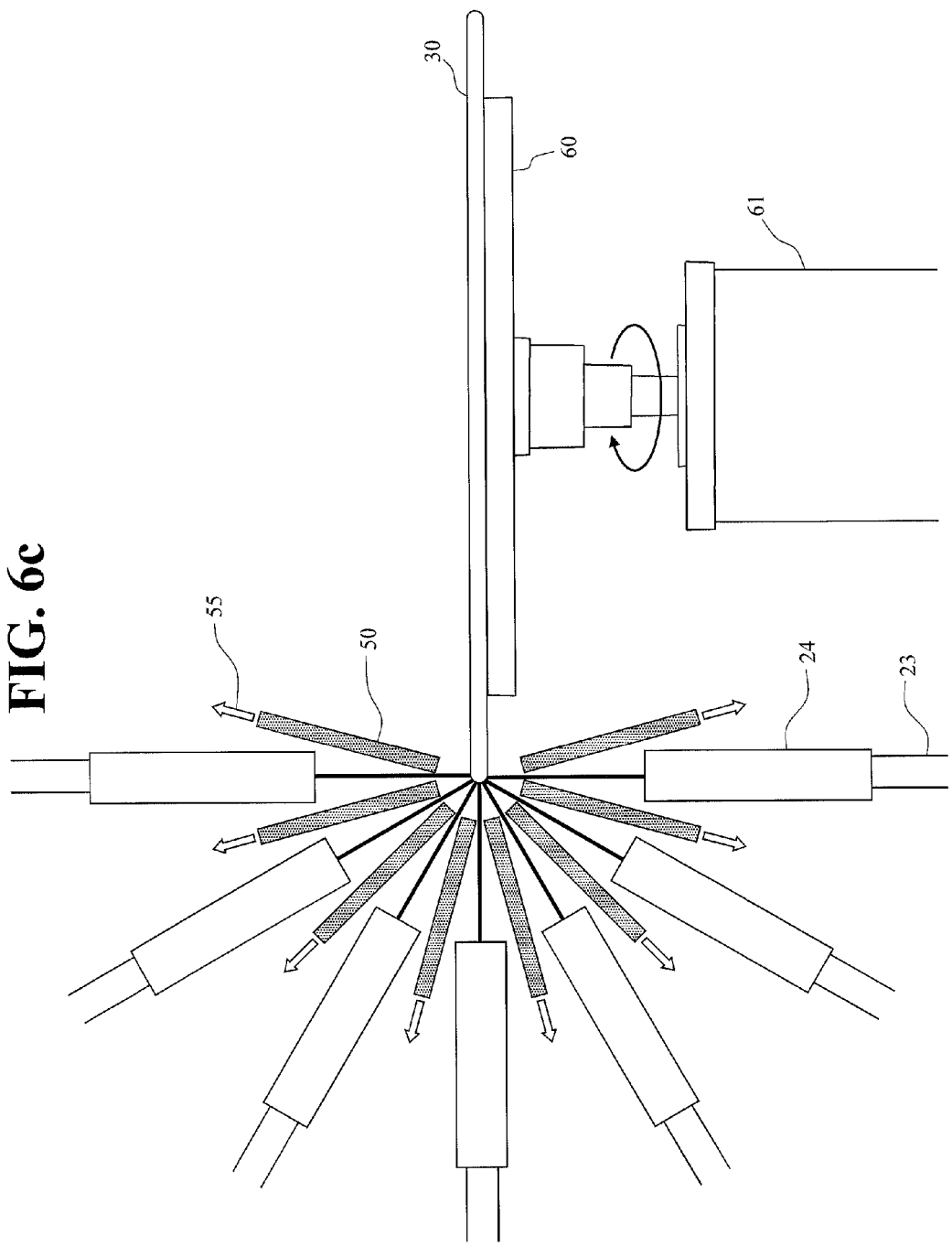

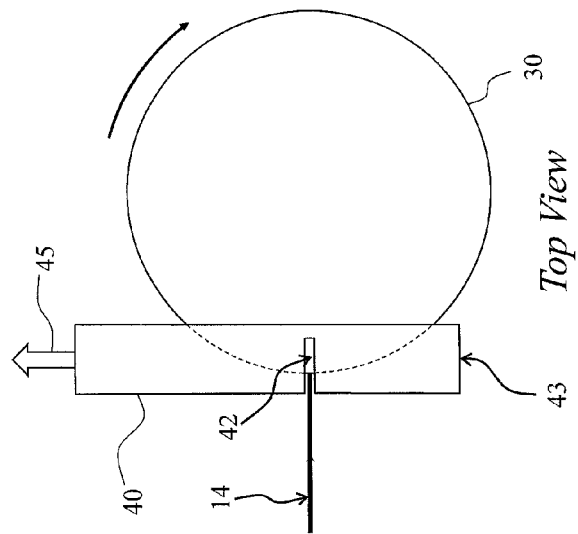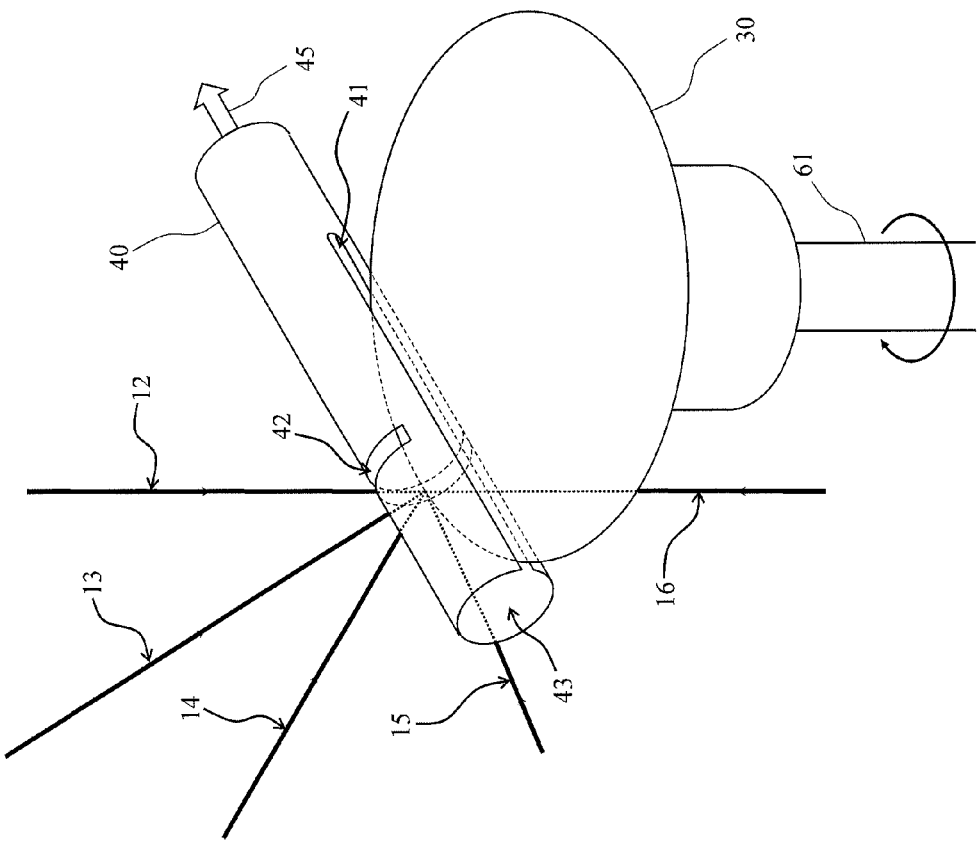

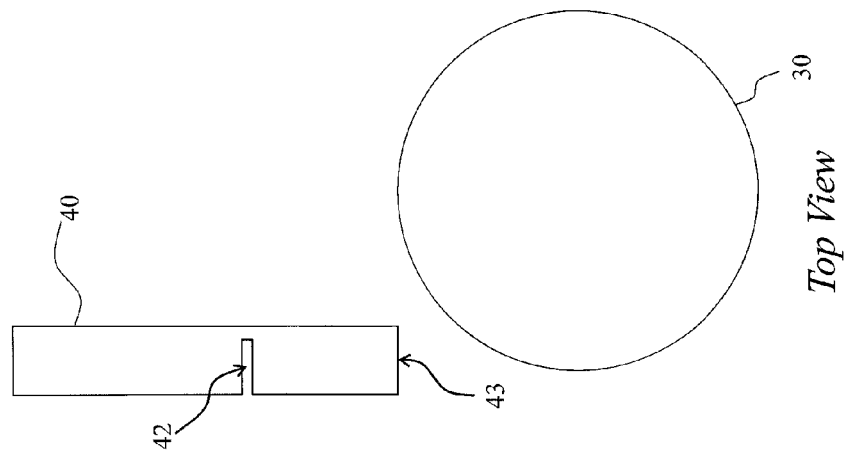
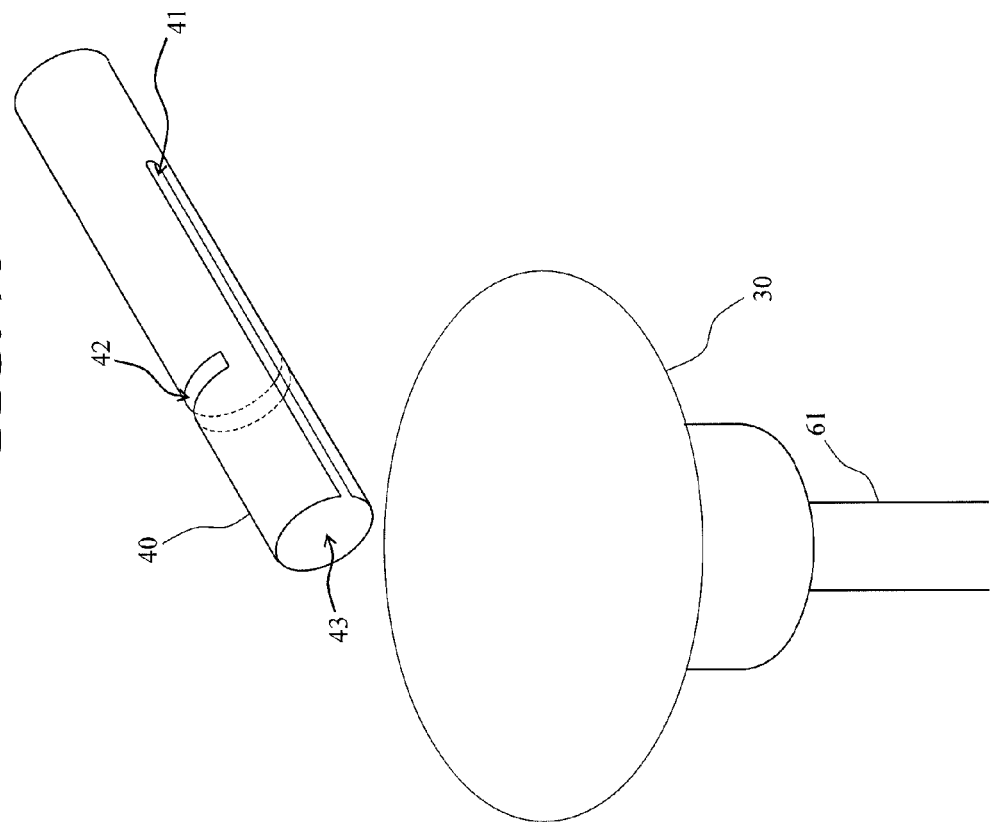

*Present Invention*

FIBER-OPTIC BEAM DELIVERY SYSTEM FOR WAFER EDGE PROCESSING

RELATED APPLICATION(S)

This application claims the benefit of U.S. Provisional Application No. 61/419,602, filed on Dec. 3, 2010. The entire teachings of the above application are incorporated herein by reference.

TECHNICAL FIELD

This patent application generally relates to wafer processing in the manufacture of integrated circuits, and to a method and apparatus for removal of films from semiconductor substrates at various stages of processing. This disclosure specifically relates to a fiber-optic beam delivery system for the removal of organic, inorganic, and other semiconductor films, residues, and particles from the edges of silicon wafers or other substrates. These materials are removed in order to reduce the number of edge-related defects that cause loss of good die in integrated circuit manufacturing.

BACKGROUND OF THE INVENTION

In the fabrication of semiconductors, a number of different types of unwanted films, particles, and residues are formed or are left on the edges of silicon wafers. The relevant edges include the top (or front), top bevel, apex (or sidewall), bottom bevel, and bottom (or back) edges of wafers (hereinafter "wafer edges"). These edges are further specified in the International Standards published by Semiconductor Equipment and Materials International (SEMI) of San Jose, Calif. and referred to as the SEMI M1-1109 and SEMI M73-0309 specification documents.

Many types of processes are used that result in such unwanted materials, including photoresist coating, plasma etching, dielectric and metal deposition, wet etching, grinding, and chemical mechanical polishing (CMP). These processes all result in various films, residues, and particles being deposited or left on the wafer edges.

The unwanted materials on wafer edges may be organic polymer films, such as photoresist edge beads, or residues, such as post-etch polymer films that remain on the edge of a wafer after a plasma etching operation. Other types of unwanted materials on wafer edges include metals, 'black silicon', silicon particles, and polishing residues.

During semiconductor manufacturing, wafers are transported from one tool to another in cassettes, and once loaded into a tool, are moved between process stations with robots handlers. As a consequence, films at the very edges of wafers become abraded, cracked, and broken. Cracked film fragments and particles contaminate vacuum chucks, robotic handlers, and cassettes, causing tool down time and die yield loss. Backside wafer contamination may distort or tilt the wafer during subsequent imaging, also causing yield loss.

Another source of wafer edge defects is the formation of a photoresist edge bead, caused when the wafers are spin coated prior to lithographic imaging. Photoresist spin coating is repeated many times in the fabrication of an integrated circuit chip, depending on the number of lithographic levels used to make the device. A thickened bead of photoresist is formed at the outermost top edge. Excess photoresist also migrates to the apex, beveled edges, and bottom edge of the wafer. The photoresist bead on the edge is easily cracked by robots handling the wafers, resulting in flakes of photoresist re-depositing on good die, causing yield loss. Any photoresist remaining on the wafer's bottom edge also sticks to vacuum chucks, causing leveling and distortion problems in lithography, and creating more cracked flakes of photoresist. Two methods are currently used for the removal of photoresist edge bead films. The first method is called wafer edge exposure and development (WEE), a two-step process described below in a prior art patent. The second conventional method for photoresist removal from wafer edges is solvent spraying or solvent cleaning.

Another example is residue left behind from plasma etching. These etch residues are thin, tough films such as halogenated polymers. They are deposited mainly on the wafer's bevel, apex, and bottom edges. They cannot be removed by conventional wet chemical means, and are currently removed with a grinder, in combination with a fluid to make a slurry. This is a messy and particle-generating process that leaves many defects behind. If these etch residues are not removed, they will crack, break up and leave particles on otherwise usable portions of the wafer, causing die loss.

Another example of an edge-cleaning problem is the removal of copper films from wafer edges, left over from copper metallization and etching steps. Remaining copper films on the wafer edges will cause electrical shorting and arcing during subsequent wafer processing steps. Copper films left on wafer edges must removed by a complex etching operation, for example wet etching followed by high purity water rinsing and drying steps.

Another edge cleaning problem is the treatment of 'black silicon' needle-like structures that are the result of a reactive ion etch (RIE) process. These structures are currently removed by a wet-etch process using hydrofluoric acid, followed by high purity water rinsing and drying steps.

Another example of an edge cleaning problem is the generation of silicon particles from edge thinning operations, commonly used in 3D interconnect devices. Grinding with abrasive wheels leaves large ridges of silicon that interfere with wafer-to-wafer bonding operations. Currently, the only method of removing these ridges is by chemical etching with hydrofluoric acid and water rinsing.

Another example of an edge-cleaning problem is defects resulting from chemical-mechanical polishing (CMP) residue. CMP slurries flow around the apex of wafers and onto the bottom edges. These residues and particles migrate onto vacuum chucks, robotic handlers, and other wafer processing equipment, again leading to die loss.

Yet another example of an edge-cleaning problem arises from the use of silicon-containing photoresist such as in trilayer film stacks, consisting of an organic polymer layer, a carbon-based layer, and a silicon-containing layer. The silicon content can typically be up to 50% of the polymer content, and conventional removal methods, such as wafer edge exposure and development (WEE) or solvent cleaning, will not completely remove these silicon based films. Removal of silicon layers is currently performed in an etching operation with a reactive ion etcher system using fluorinated gas mixtures, followed by considerable water rinsing and drying steps.

PROBLEMS WITH THE PRIOR ART

There are many film types to be removed from wafer edges, each requiring specific cleaning methods. Wafer edge processing in semiconductor manufacturing requires many different types of chemicals and tools, and is therefore complex and costly. Each of these conventional methods is described in more detail below with reference to specific prior art.

One example of a problem with the prior art relates to a method for dispensing liquid in a solvent-based edge cleaning process, as described in U.S. Pat. No. 5,392,989 and U.S. Patent Publication No. 2010/0051073 A1. This problem relates to the inability of the liquid solvent to control the geometry of the cleaned edge. The cleaning fluid is dispensed and spreads on the wafer surface, leaving a tapered edge of photoresist that may be several millimeters wide. The width of the area on the periphery of the wafer lost due to edge cleaning is called the 'edge exclusion'. The International Technology Roadmap for Semiconductors (ITRS) specifies the parameters for integrated circuit production into the future, and the semiconductor industry companies follow this path. The ITRS specifies a reduction of the edge exclusion from the current 3-5 mm to below 1 mm in the future. Solvent-based edge cleaning cannot currently meet this specification due to the inability to effectively control the solvents. This inability includes solvent splashing onto good die causing yield loss. Organic solvents, such as ethyl lactate or cellosolve acetate, cause environmental problems, raise safety concerns, and are costly to use. Finally, after solvent edge cleaning, a thin residue of photoresist is typically left behind, requiring further chemical processing and rinsing to remove.

Another example of a problem with the prior art relates to etching the edge of a wafer in a chamber with acids, as described in U.S. Pat. No. 7,267,726 B2 and U.S. Pat. No. 7,182,821 B2. Some of the acids used are hydrofluoric (HF), sulfuric ($H_2SO_4$), and nitric ($HNO_3$). These chemicals are hazardous to use and require the use of complex and costly equipment, raising environmental problems and safety concerns. As with the solvent method listed above, it is difficult to effectively control the width of the edge exclusion zone. This method is specifically used to remove metal films, but due to the non-uniformity of these films at the edge of the wafer, it is difficult to control the etch depth. This method is also used for removing Teflon-like particles, but is not effective for removing photoresists.

Another example of a problem with the prior art relates to photoresist edge bead exposure and development (WEE), as described in U.S. Pat. No. 6,495,312 B1, U.S. Pat. No. 7,460,211 B2, and U.S. Patent Publication No. 2010/0285399 A1. This method requires two pieces of equipment to remove the photoresist edge bead: an exposure source, which is a high intensity lamp, and a separate wet developing system that uses an alkaline developer followed by a single or double rinse with high purity water. Since multiple pieces of equipment are used, this increases the time to complete the process, reducing throughput. The exposure step is often not adequate in removal of very thick edge beads; therefore a solvent cleaning process step is required. This method addresses photoresist edge beads, but there are many other types of more difficult films, such as post-etch polymers, that need to be removed, but cannot be addressed with WEE. Finally, since WEE only removes films from the top edge of the wafer, the apex and bottom edge must be cleaned by another method.

Another example of a problem with the prior art relates to a lithographic masking method, as described in U.S. Patent Publication No. 2007/0093067 A1 and U.S. Pat. No. 7,745,095 B2. This method is complex in that at least four individual steps are required to clean the wafer edge. Steps may include pre-cleaning, depositing and removing of organic coatings, lithographic exposure, developing, rinsing, and drying. This method requires multiple pieces of expensive equipment, consumes considerable volumes of solvent and water, and reduces throughput.

Another example of a problem with the prior art relates to a method using reactive plasma, as described in U.S. Pat. No. 7,651,585 B2 and U.S. Patent Publication No. 2010/0099265 A1. This method requires a complex plasma-etching tool using a vacuum chamber and reactive gases. The plasma is a non-uniform field of energetic ions surrounding the edge of the wafer; thus there is a gradient in the film being removed instead of a sharply defined edge. The width of the gradient adds to the edge exclusion zone, thereby reducing the usable die area. The complexity of the tool, as well as the vacuum chamber pump time, adds considerable cost and limits throughput.

Another example of a problem with the prior art relates to mechanical methods for cleaning wafer edges as described in U.S. Patent Publication No. 2010/0190416 A1 and U.S. Patent Publication No. 2009/0029629 A1. Chemical mechanical polishing (CMP) uses an abrasive polishing pad and wet chemicals to polish the wafer. The by-product of this process is a polishing slurry residue left on the bottom and edges of the wafer. The current method for removing this slurry residue is frictional surface cleaning, as described in U.S. Patent Publication No. 2009/0044831 A1. This method leads to loss of usable die due to particle generation.

Another example of a problem with the prior art relates to the use of frozen carbon dioxide particles to clean wafer edges, as described in U.S. Pat. No. 7,270,136 B2. The problems with this method are that the equipment used to perform this process is highly complex and expensive, and the impact of the frozen particles can cause damage to the substrate and to otherwise usable die.

Another example of a problem with the prior art relates to applying a flame to the edge of a wafer in the presence of reactive gasses including halogens and ozone, as described in U.S. Patent Publication No. 2008/0010845 A1. For example, a hydrogen-rich flame with oxygen and nitrogen trifluoride ($NF_3$) produces hydrogen fluoride (HF) that etches the edge of the wafer. Nitrogen trifluoride is a highly toxic and expensive gas that is typically used to clean deposition chambers in semiconductor manufacturing. Further, this method may require pre-heating the wafer to prevent condensation of the by-products onto the wafer, causing die loss. The apparatus described is very complex since the gas plumbing and safety requirements are extreme for the types of gases proposed for this edge cleaning method. Lastly, the method cannot remove films from all wafer edges in a single step and is not effective for photoresist removal.

Another example of a problem with the prior art relates to the use of a pressurized stream of a non-solvent medium, which may be a gas, to clean wafer edges, as described in U.S. Patent Publication No. 2004/0126923 A1. An expected problem with this method would be the scattering of particles onto the usable areas of the wafer, as well as the surrounding equipment. Additionally, this patent application claims that the medium must not be a solvent for the material being removed, which severely limits use on a variety of films due to its non-reactive nature.

Finally, another example of a problem with the prior art relates to the method of using an oblique-angled nozzle containing a laser beam combined with inert gas, as described in U.S. Pat. No. 6,874,510 B2. One problem with this method is that the beam used to clean the wafer edge is inside the gas delivery nozzle, such that the gas cannot be independently directed to prevent material from falling onto the good die toward the center of the wafer. Such laser reactions create a cloud of debris. If the gas nozzle is not positioned to remove this cloud away from the center of the wafer, debris will re-deposit onto good die causing yield loss. This prior art uses a chamber, which further complicates the process of removing the debris, as it becomes confined in the chamber, and can re-deposit onto the wafer as well as build-up on the chamber walls. Another problem with this prior art method is that the gas used is inert, and therefore does not permit reaction with films on the wafer edges. Yet another problem with this prior art is that this method shows cleaning only on the top surface. However, if a source of this type were redirected to the apex, the reaction by-products would be blown onto the good die at the center of the wafer, causing significant die loss. Still another problem with this prior art is that it requires the laser beam to impinge on the wafer edge at an oblique angle, introducing several problems including beam distortion and focusing issues at the wafer plane.

Due to the limitations of current edge cleaning methods, otherwise usable space on the periphery of a wafer is consumed. As an example, with a die size of 7.5 mm×7.5 mm, increasing the usable space on a 300 mm wafer by decreasing the edge exclusion width from 5.0 mm to 0.6 mm results in a potential gain of 64 die per wafer. Therefore, considerable effort is given to keep the edge cleaning area, called the edge exclusion, to a minimum. The ITRS, specifically in the area of edge exclusion, indicates the need to move from current 3-5 mm edge exclusion down to 1 mm or less in the next two years. Conventional wet edge bead cleaning methods are unable to control edge exclusion to this level due to the natural movement of liquids on smooth surfaces, such as a highly polished silicon wafer. It is recognized by those practiced in the art that a non-liquid means of edge cleaning is needed to meet the ITRS guidelines.

Thus there is a need for an improved method and apparatus for cleaning the edges of substrates, such as silicon wafers, which overcomes the aforesaid limitations of the cited prior art. There is also a need for a method and apparatus that does not require the use of solvents, corrosive chemicals, or large volumes of highly purified water. There is also a need for a method and apparatus that prevents process by-products from re-depositing onto usable die. There is a further need for an improved method and apparatus for edge cleaning that can address a wide variety of films, eliminating the need for different systems for each film type. There is also a need for an edge cleaning method and apparatus that can accurately clean all wafer edges (top, top bevel, apex, bottom bevel, and bottom) in a single tool, thereby reducing the cost and complexity of the cleaning process. Finally, there is a further need for an edge cleaning method and apparatus that can precisely control the width of the area being cleaned on the edge of a substrate to 1 mm or less, in order to increase the die yield and meet future semiconductor manufacturing requirements.

SUMMARY

The present disclosure is directed to removal or transformation of unwanted films, particles, and residues on the edges of substrates, such as silicon wafers, by directing laser radiation, in the presence of air or other fluids, to the top edge, top bevel, apex, bottom bevel, and bottom edge (hereinafter 'wafer edges') portions of the substrate. By-products are removed by means of a vacuum exhaust.

More specifically, in a preferred embodiment, a single fiber feeds an output coupler mounted on a curved track, which continuously directs the beam to any or all wafer edges. In another embodiment, a beam distribution module is coupled to a laser and directs one or more laser beams into corresponding optical fibers. The optical fibers then feed corresponding output couplers. The output couplers can be permanently fixed in location or mounted to positioning devices to direct laser beams to two or more wafer edges, either sequentially or simultaneously.

One object herein is to direct a laser beam onto all edges of a rotating substrate in order to address a wide variety of materials in a single tool with a single dry process. A preferred embodiment processes materials on all wafer edges, in a single tool, by the use of a fiber optic beam delivery assembly to direct the laser beam to each edge.

Another object is to process circumferential bands on the edges of a wafer that are wider than the laser beam. In a preferred embodiment, an output coupler is moved along a curved track for this purpose. In another embodiment, multiple output couplers are mounted on positioning devices for this purpose. In yet another embodiment, an array output couplers direct beams to different points along the wafer edge for this purpose.

Another object herein is to provide an apparatus that can be integrated into an edge processing system that does not require the use of solvents, corrosive chemicals, or large volumes of highly purified water, and does not harm the environment. In accordance with a preferred embodiment, the system operates at atmospheric pressure and uses laser radiation in the presence of gases, such as air or benign gas mixtures, to remove materials from wafer edges. This system permits the use of a dry process, eliminating the need for significant volumes of high-purity water, concentrated acids, highly alkaline solutions, proprietary strippers, or solvents.

Another object herein is to prevent process by-products from re-depositing onto usable die. In accordance with a preferred embodiment a laser and fiber-optical beam delivery assembly in conjunction with a vacuum exhaust system removes unwanted films, particles, and residues from wafer edges without re-depositing by-products onto otherwise usable die. A preferred embodiment uses a cylindrical exhaust tube, which envelops the substrate edge, with a longitudinal slot for the substrate and circumferential slots for the laser beam, and a vacuum exhaust source to create airflow to carry by-products and film residues away from the reaction zone, preventing any debris from landing elsewhere on the substrate.

Another object herein is to remove or transform a wide variety of materials on all of the wafer edges in a single tool with a single dry process, eliminating the need for different systems for each material type and thereby reducing the cost and complexity of current processing methods. In accordance with a preferred embodiment, a fiber-optical beam delivery assembly is provided that can be integrated into an edge processing apparatus to effectively remove or transform multiple film types, residues, and particles including, but not limited to, photoresist edge beads, photoresist residues, silicon-based polymer films, post-etch polymer residues, multi-layer film stacks, polishing residues, particles, metal films, and dielectric films. This is achieved by the interaction of the laser radiation with the unwanted films, residues, or particles and surrounding gas on all wafer edges.

Another object is to precisely control the width of the area being processed on the edge of a substrate, in order to increase the number of usable die and meet future semiconductor manufacturing requirements. This is accomplished by the use of a high-accuracy fiber-optical beam delivery assembly directing a precisely defined laser beam to all of the wafer edges.

Further objects, technologies, and areas of applicability of the method and apparatus will become apparent from the detailed description provided hereinafter. It should be understood that the detailed description and specific examples, while indicating the preferred embodiment of the invention, are intended for the purposes of illustration only and are not intended to limit the scope of the invention, the scope of which is only being defined by the various claims herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. The organization and manner of the structure and operation of preferred embodiments, together with the above and further objects and advantages thereof, may best be understood by reference to the following description taken in conjunction with the accompanying drawings wherein like reference numerals identify the elements in which:

FIG. 3a is a side-view schematic drawing showing three mechanisms that move three fiber-optic heads to deliver laser beams across the top, apex, and bottom of a rotating wafer.

FIGS. 3b-d are cross-sectional views of the beam scanning the edges of a wafer.

FIG. 4a is a side-view schematic drawing showing five mechanisms that move five fiber-optic heads to deliver laser beams across the top, top bevel, apex, bottom bevel, and bottom of a rotating wafer.

FIGS. 4b-f are cross-sectional views of the beam scanning the edges of a wafer.

FIG. 5a is a side-view schematic showing a single fiber-optic head mounted on a track to deliver a laser beam to all edges of a rotating wafer.

FIG. 5b is a cross-sectional view of the beam scanning all edges of a wafer.

FIG. 6a is a side-view schematic drawing showing multiple fixed fiber-optic heads delivering laser beams to the edges of a rotating wafer.

FIG. 6b is a cross-sectional view of multiple fixed beams being directed to multiple edges of a wafer.

FIG. 6c is a side-view schematic drawing showing multiple exhaust nozzles used with the configuration shown in FIG. 6a.

FIG. 7a is an isometric view schematic drawing showing an exhaust tube used with the configurations shown in FIGS. 2a, 3a, 4a, and 5a.

FIG. 7b is a top view schematic drawing showing an exhaust tube used with the configurations shown in FIGS. 2a, 3a, 4a, and 5a.

FIG. 7c is an isometric view showing the exhaust system configuration with the exhaust tube retracted for wafer loading.

FIG. 7d is a top view showing the exhaust system configuration with the exhaust tube retracted for wafer loading or unloading.

DETAILED DESCRIPTION OF THE ILLUSTRATED EMBODIMENT

Figure 1:
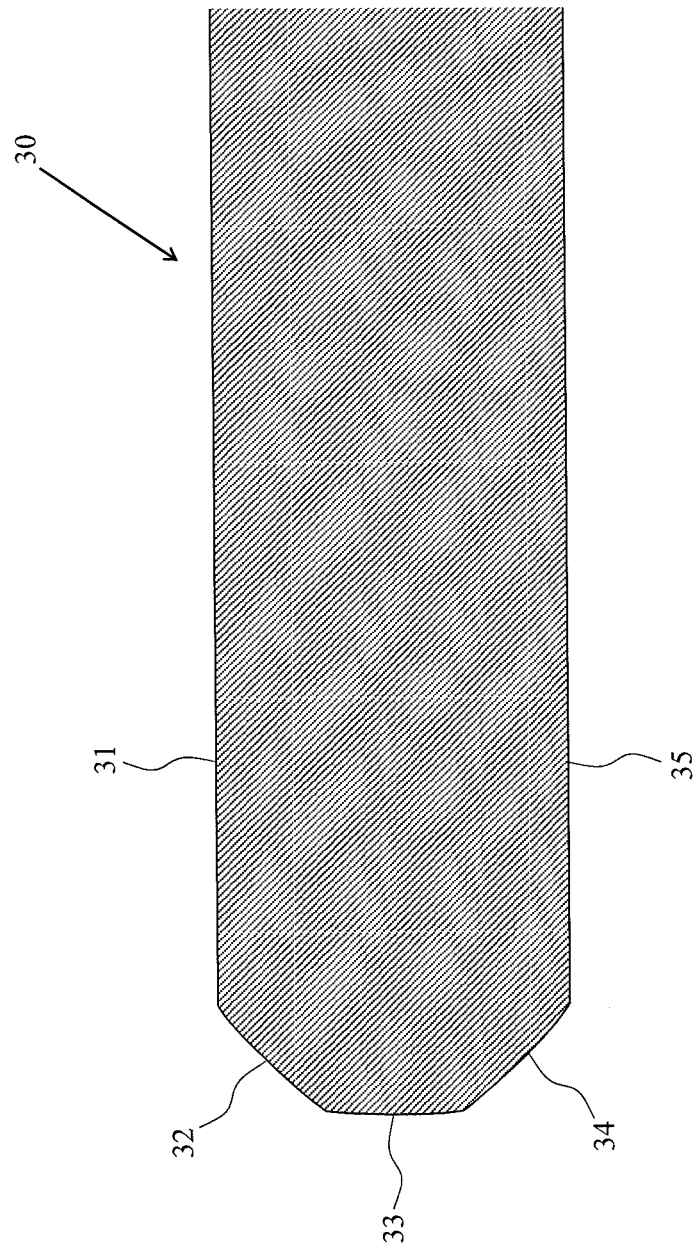
FIG. 1 is a cross-sectional diagram of a wafer identifying the surfaces addressed by the laser beam.

A description of example embodiments of the invention follows.

While the invention as recited in the claims presented elsewhere in this document may be susceptible to embodiment in different forms, there is shown in the drawings, and will be described herein in detail, one or more specific embodiments with the understanding that the present disclosure is to be considered but one exemplification of the principles of the invention, and there is no intent to limit the invention to that as illustrated and described herein. Therefore, any references to "the present invention" and "the disclosure" throughout this document are to be interpreted only as a reference to one particular, non-limiting example embodiment of but one aspect of the many inventions described and disclosed in this document.

The disclosure describes an apparatus and methods(s) for removing or transforming unwanted films, residues, and particles from the top, top bevel, apex, bottom bevel, and bottom (hereinafter 'wafer edges') of semiconductor substrates.

The present invention provides a fiber-optic delivery assembly used for removing or transforming unwanted organic or inorganic films, particles, or residues from all of the wafer edges. The wafer is mounted on a rotary chuck, allowing the entire circumference of the wafer to be cleaned.

FIG. 1 identifies the edges of a wafer 30, which are addressed by the present invention and are referred to in the specification that follows. The surfaces that are addressed are the top 31, top bevel 32, apex 33, bottom bevel 34, and bottom 35.

Figure 2:
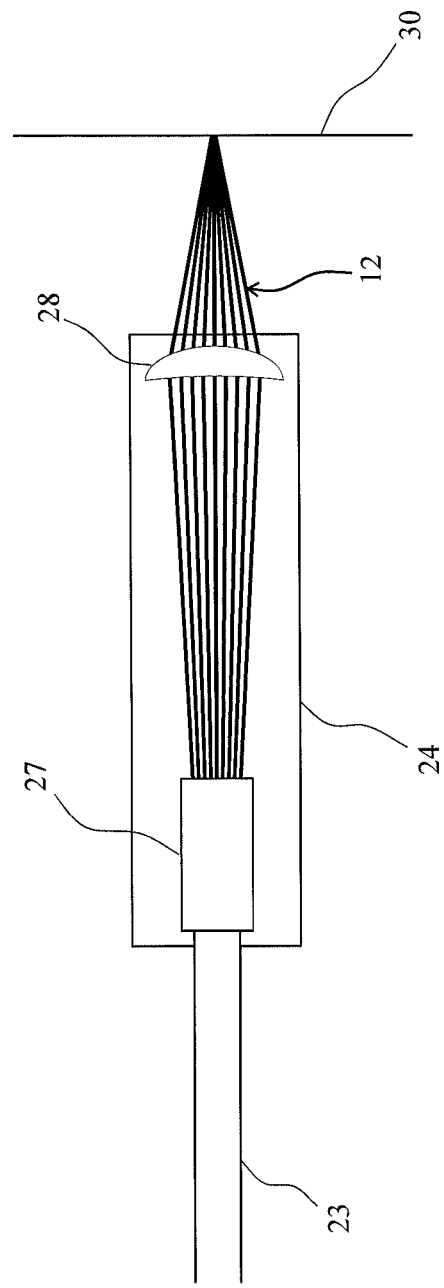
FIG. 2 is a schematic drawing of a fiber-optic head that focuses the beam onto a wafer.

FIG. 2 shows a fiber-optic head 24 that focuses a laser beam 12 from an incoming fiber 23 onto the edge of wafer 30. It includes an output coupler 27 at the end of the fiber 23 and a focusing lens 28, which contains one or more elements, mounted between the output coupler 27 and the edge of wafer 30.

The embodiment shown in FIG. 3a utilizes a laser source 10 that emits a beam 11, which enters input coupler 20 of a fiber-optic cable 21. The fiber-optic cable 21 enters a fiber-optic beam delivery assembly 81. The fiber-optic beam delivery assembly 81 contains a distribution module 22. In one embodiment the distribution module 22 splits the beam 11 into three separate beams, which pass through three fiber-optic cables 23 and three fiber-optic heads 24, mounted to three positioning devices 25. In another embodiment the distribution module 22 switches the beam between three separate fiber-optic cables 23 and fiber-optic heads 24, mounted to three positioning devices 25. The positioning devices 25 accurately locate the fiber-optic heads 24, scanning the beams 12, 14, and 16 across all edges of wafer 30. The wafer 30 is placed on a chuck 60, rotated by a servomotor assembly 61. Reaction by-products are removed by means of an exhaust tube 40. FIG. 3b shows beam 12 scanning wafer 30 radially inwards and removing film, residue, or particles 36 from the top bevel 32 and top 31 of wafer 30, as shown in FIG. 1. FIG. 3c shows beam 14 scanning wafer 30 axially downwards and removing film, residue, or particles 36 from the top bevel 32, apex 33 and bottom bevel 34 of wafer 30, as shown in FIG. 1. FIG. 3d shows beam 16 scanning wafer 30 radially inwards and removing film, residue, or particles 36 from the bottom bevel 34 and bottom 35 of wafer 30, as shown in FIG. 1.

The embodiment shown in FIG. 4a utilizes a laser source 10 that emits a beam 11, which enters input coupler 20 of a fiber-optic cable 21. The fiber-optic cable 21 enters a fiber-optic beam delivery assembly 81. The fiber-optic beam delivery assembly 81 contains a distribution module 22. In one embodiment the distribution module 22 splits the beam 11 into five separate beams, which pass through five fiber-optic cables 23 and five fiber-optic heads 24, mounted to five positioning devices 25. In another embodiment the distribution module 22 switches the beam between five separate fiber-optic cables 23 and five fiber-optic heads 24, mounted to five positioning devices 25. The positioning devices 25 accurately locate the fiber-optic heads 24, scanning the beams 12, 13, 14, 15, and 16 across all edges of wafer 30. The wafer 30 is placed on a chuck 60, rotated by a servomotor assembly 61. Reaction by-products are removed by means of an exhaust tube 40. FIG. 4b shows beam 12 scanning wafer 30 radially inwards and removing film, residue, or particles 36 from the top bevel 32 and top 31 of wafer 30, as shown in FIG. 1. FIG. 4c shows beam 13 scanning wafer 30 diagonally and removing film, residue, or particles 36 from the top 31, top bevel 32, and apex 33 of wafer 30, as shown in FIG. 1. FIG. 4d shows beam 14 scanning wafer 30 axially downwards and removing film, residue, or particles 36 from the top bevel 32, apex 33 and bottom bevel 34 of wafer 30, as shown in FIG. 1. FIG. 4e shows beam 15 scanning wafer 30 diagonally and removing film, residue, or particles 36 from the bottom 35, bottom bevel 34, and apex 33 of wafer 30, as shown in FIG. 1. FIG. 4f shows beam 16 scanning wafer 30 radially inwards and removing film, residue, or particles 36 from the bottom bevel 34 and bottom 35 of wafer 30, as shown in FIG. 1.

The preferred embodiment shown in FIG. 5a utilizes a laser source 10 that emits a beam 11, which enters input coupler 20 of a fiber-optic cable 23. The fiber-optic cable 23 enters a fiber-optic beam delivery assembly 81 where it attaches to a fiber-optic head 24. The fiber-optic head 24 slides along a track 26. In order to provide the same beam profile at all points around the edge of wafer 30, the track 26 is shaped in such a way as to position the fiber-optic head 24 exactly the same distance from, and orthogonal to the edge of wafer 30 as it travels around track 26, scanning beam 17 around the edge of wafer 30. The wafer 30 is placed on a chuck 60 and is rotated by a servomotor assembly 61. Reaction by-products are removed by means of an exhaust tube 40. FIG. 5b shows beam 17 being scanned around the edge of wafer 30 from the top to the bottom and removing film, residue or particles 36.

The embodiment shown in FIG. 6a utilizes a laser source 10 that emits a beam 11, which enters input coupler 20 of a fiber-optic cable 21. The fiber-optic cable 21 enters a fiber-optic beam delivery assembly 81. The fiber-optic beam delivery assembly 81 contains a distribution module 22. In one embodiment the distribution module 22 splits the beam 11 into multiple separate beams, which pass through corresponding fiber-optic cables 23 and fiber-optic heads 24, mounted in fixed positions around the edges of wafer 30. In another embodiment the distribution module 22 switches the beam 11 into multiple separate beams, which pass through corresponding fiber-optic cables 23 and fiber-optic heads 24, mounted in fixed positions around the edges of wafer 30. Each fiber-optic head emits a beam 17 addressing a portion of the edge of wafer 30. Wafer 30 is placed on a chuck 60 and is rotated by a servomotor assembly 61. Reaction by-products are removed by means of an exhaust tube 40. FIG. 6b shows beams 17 being directed to multiple edges of wafer 30 and removing a film, a residue or particles 36.

FIG. 6c shows an alternative exhaust system for the fiber-optic configuration of FIG. 6a. In this configuration, multiple exhaust tubes 50 are used to draw the by-products 55 away from the edge of the wafer 30, and into an external exhaust system.

An exhaust system shown in FIGS. 7a and 7b carries reaction by-products 45 away from the reaction site at the wafer 30. The servomotor assembly 61 rotates wafer 30 through a slot 41 in the side of exhaust tube 40. Laser beams 12, 13, 14, 15, and 16 are directed through slot 42 to all edges of wafer 20. An external exhaust source, draws ambient gas through the intake end 43 of the exhaust tube 40, thus carrying away reaction by-products 45. In another embodiment, reversing the rotation to oppose the direction of the exhaust flow may increase the relative flow velocity at the wafer surface thereby improving the performance of the exhaust system.

FIGS. 7c and 7d show the same exhaust system as shown in FIGS. 7a and 7b, with the exhaust tube 40 in a retracted position to allow a robot to load or unload the wafer 30.

Figure 8A:
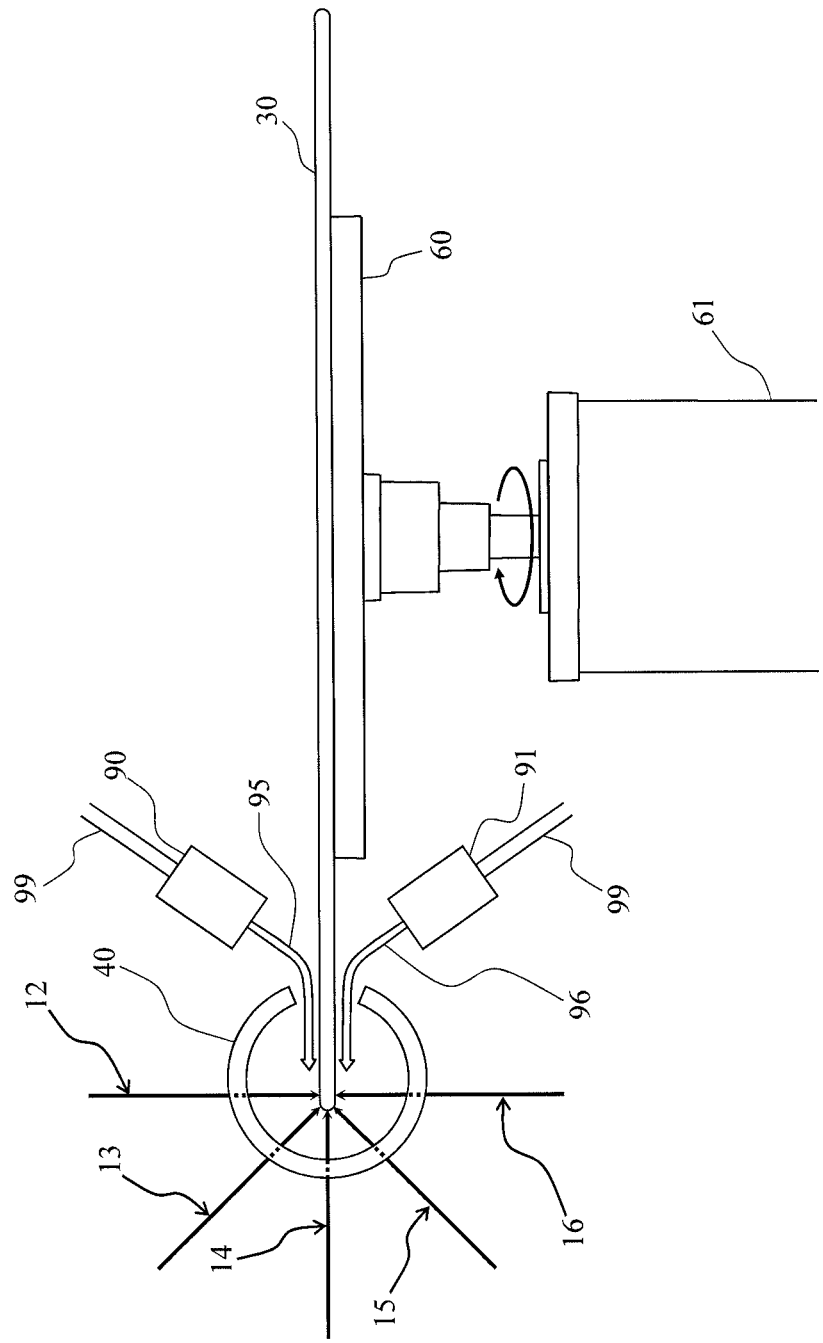
FIG. 8a is a side view of an optional gas injection system of the edge processing system.
Figure 8B:
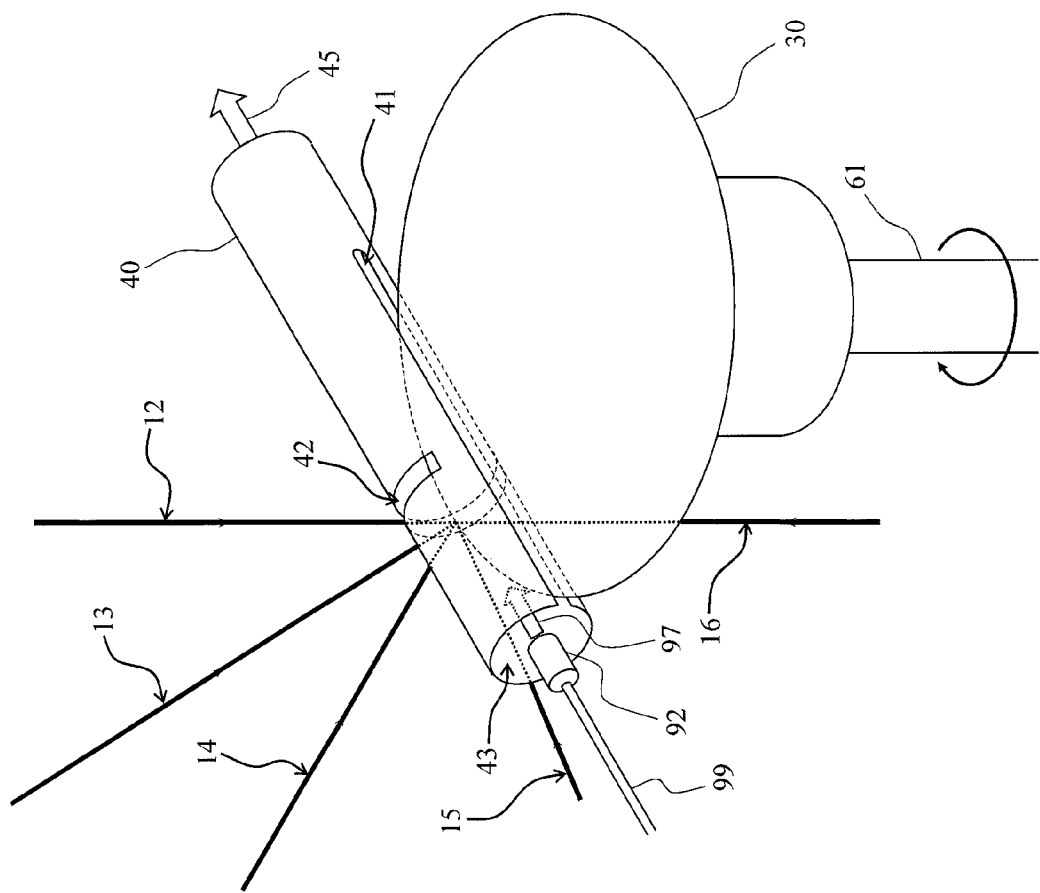
FIG. 8b is an isometric view of a second configuration of an optional gas injection system of the edge processing system.
Figure 8C:
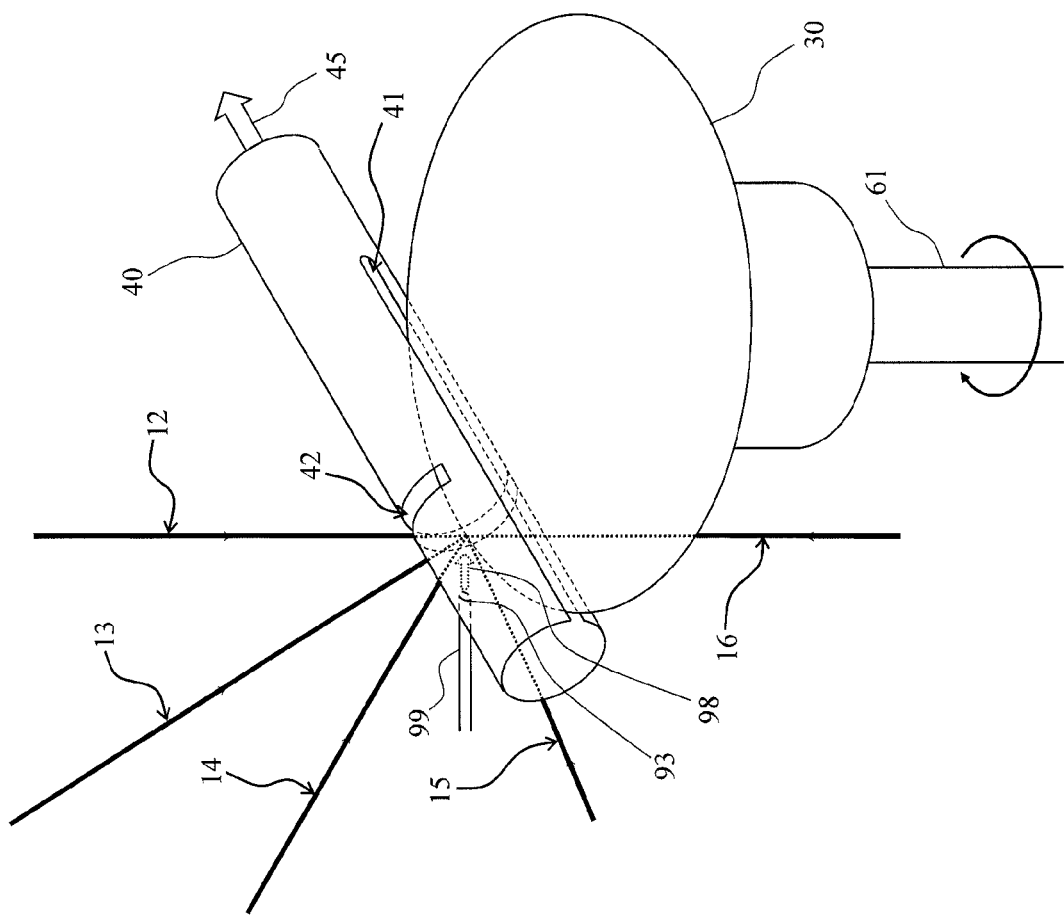
FIG. 8c is an isometric view of a third configuration of an optional gas injection system of the edge processing system.

The optional gas injection systems shown in FIGS. 8a, 8b, and 8c may enhance the reaction between the laser beam and the material being processed. Gases are fed from an external source into the system. Such injected gas may be beneficial in processing the unwanted films, residues, or particles. In a preferred embodiment, the injected gas is an oxidizing gas. Reducing gases such as hydrogen are also effective in removing photoresist. In another embodiment, the injection of hydrogen may also be used to prevent the formation of an oxide layer. The gas injection system may also enhance the removal of unwanted by-products.

In one embodiment, shown in FIG. 8a, the gas streams 95 and/or 96 are produced by a top injector 90 and/or a bottom injector 91 that are fed by gas lines 99. To optimize the reaction, the angle of the injectors 90 and/or 91 can be adjusted with respect to the surface of wafer 30, which is mounted on vacuum chuck 60 and is rotated by servomotor assembly 61. The laser beams 12, 13, 14, 15, and 16 process the edges of wafer 30 while gas streams 95 and/or 96 are flowing.

In another embodiment of an optional gas injection system, shown in FIG. 8b, the gas stream 97 is produced by an axial injector 92 that is fed by a gas line 99 into the intake end 43 of the exhaust tube 40. This configuration adds gas to the environment surrounding the reaction site. The laser beams 12, 13, 14, 15, and 16 process the edges of wafer 30 while gas stream 97 is flowing.

In a third embodiment, shown in FIG. 8c, the gas stream 98 is produced by an injector 93, attached to an orifice in the side of the exhaust tube 40, and fed by gas line 99 such that the gas flow is aimed at the reaction site on the wafer 30. The laser beams 12, 13, 14, 15, and 16 process the edges of wafer 30 while gas stream 98 is flowing.

Other configurations combining the above injection methods and/or exhaust baffles may be used to enhance the reaction.

Figure 9:
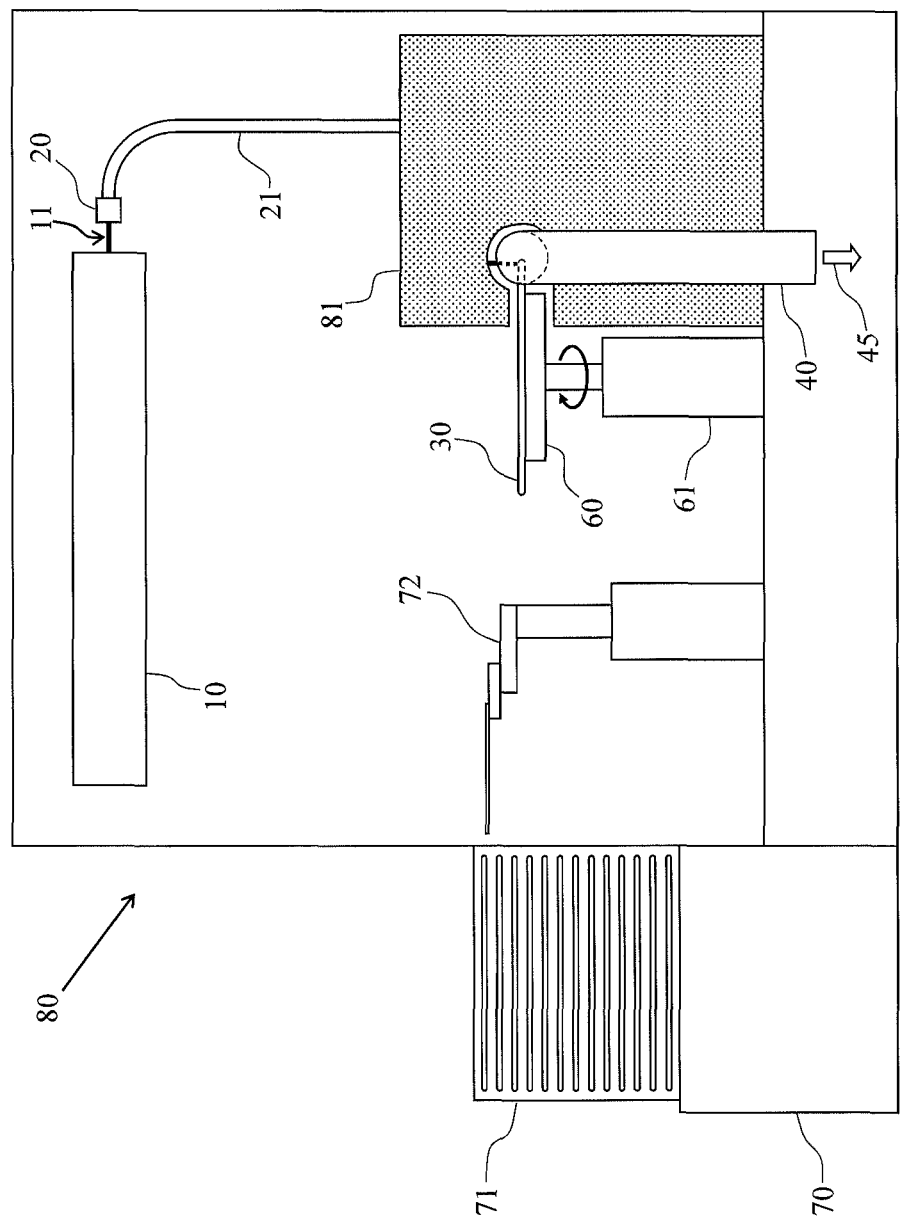
FIG. 9 is a side view of the fiber-optic beam delivery assembly integrated into a wafer processing system.

FIG. 9 shows a fiber-optic beam delivery assembly 81 and all of its supporting components integrated into an embodiment of a wafer edge processing system 80. Robot 72 gets wafer 30 from FOUP (Front Opening Unified Pod) 71, which is located on top of load port module 70, and places wafer 30 onto vacuum chuck 60. Exhaust tube 40 is then slid into place around wafer 30. Laser 10 emits beam 11, which enters fiber-optic cable 21 through input coupler 20, and then enters fiber-optic beam delivery assembly 81. As wafer 30 is rotated by the servomotor assembly 61, fiber-optic beam delivery assembly 81 directs the beam to one or more wafer edges, as shown in FIGS. 3*b*-3*d*, FIGS. 4*b*-4*f*, FIG. 5*b*, and FIG. 6*b*. Exhaust tube 40 carries by-products 45 away from the reaction site. After wafer 30 has been processed, exhaust tube 40 slides away from the wafer 30 and robot 72 removes wafer 30 from vacuum chuck 60 and returns it to FOUP 71.

The preferred embodiment is an all-dry process with no waste-treatable by-products. Edge processing or edge film removal from the top bevel, apex, bottom bevel, and bottom edges of the wafer can also be accomplished during the same process cycle. This method and apparatus is capable of processing 0 to 25 mm from the bottom edge, to an accuracy of +/−0.1 mm, in order to remove the photoresist that has migrated to the bottom side of the wafer. Likewise, the method and apparatus is capable of processing 0 to 25 mm from the top edge, to an accuracy of +/−0.1 mm. Cleaning the apex is also important since this edge of the wafer contacts the sides of wafer cassettes and robotic handlers used during transport in a manufacturing line. Any breaks or cracks in an un-removed edge bead can then create particles that may get transferred to other cassettes and other wafers, causing defects and loss of useable die.

Figure 10B:
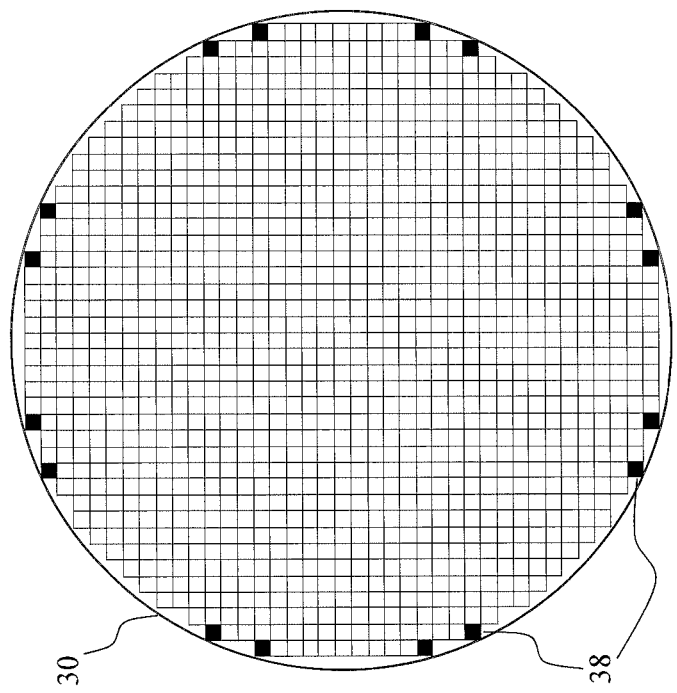
FIG. 10b shows an example of the usable die lost with the edge processing method and apparatus disclosed herein.
Figure 10A:
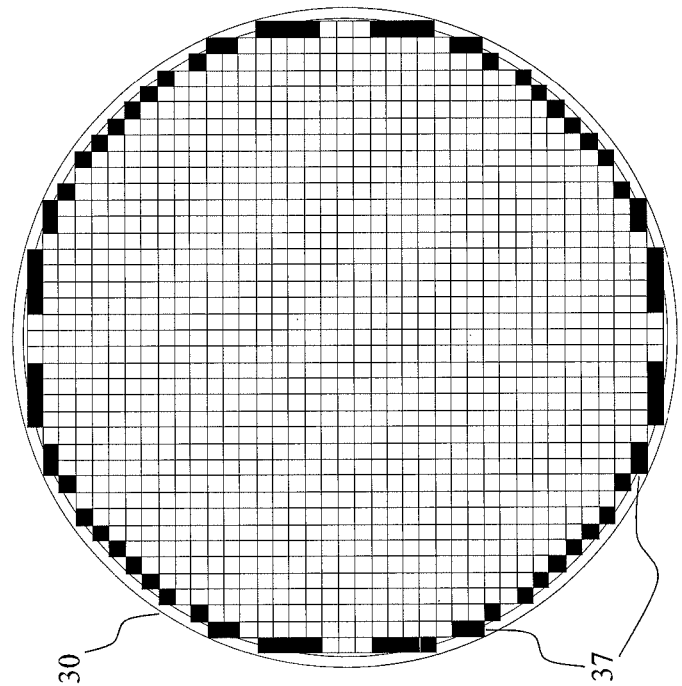
FIG. 10a shows an example of the usable die lost with prior art edge exclusion.

Current solvent dispense methods that are used to remove the photoresist edge bead are difficult to control. Using the system described herein, the edge exclusion width can be reduced from the current 3-5 mm to less than 1 mm. FIG. 10*a* shows an example of a wafer 30 with a 5.0 mm edge exclusion width. Any die that are intersected by the edge exclusion region are lost. In this example there are eighty lost die 38. Using an embodiment described herein, the edge exclusion width can be reduced to 0.6 mm, limited only by the accuracy of the beam placement, which is better than 0.1 mm. This results in only sixteen lost die 39, as shown in FIG. 10*b*.

In preferred embodiments the laser is a Nd:YAG laser and is configured to emit pulsed radiation at a wavelength of 355 nm, with a range of pulse repetition rates from 10,000 Hz to 100,000 Hz, which result in variable power levels and pulse energies. Other YAG lasers can be configured to emit radiation at other repetition rates in a range from 1,000 Hz to 500,000 Hz, and other wavelengths such as 213 nm, 266 nm, 532 nm, and 1064 nm. These characteristics may be beneficial to provide higher energy absorption by the material being processed, which leads to more complete reactions, higher throughput, and may enable processes that are ineffective at 355 nm. Other wavelengths, such as 193 nm, 248 nm, or 308 nm produced by an excimer laser, may be useful for certain applications. Still other applications may benefit from the use of a continuous wave (CW) laser such as a 364 nm argon ion laser.

Beam shaping optics may be used to alter the profile of the laser beam. In one embodiment, diffractive beam-shaping optics are used to produce a beam that has a top-hat profile in the scan direction but a Gaussian profile in the perpendicular direction. In another embodiment, diffractive beam-shaping optics are used to produce a rectangular beam that has a top-hat profile in both directions. In yet another embodiment, a homogenizer is used to create a uniform beam profile. By thus flattening the beam profile, wider process latitude, selective material removal, and sharper edge definition can be achieved.

One application of the systems and methods described herein is to eliminate problems that result after a sub-micron layer of photoresist is spin-coated onto a silicon wafer and baked. This process causes a thickened bead of photoresist at the wafer edge. To prevent peeling and de-lamination by the immersion fluid used in an imaging tool, such as the ASML 193 nm laser-based step-and-scan system, the resulting bead of photoresist on the edge of the wafer must be removed prior to the lithographic step. The present invention provides a method and apparatus for removing this edge bead. If the photoresist bead is not removed, the fluid flows over the wafer during exposure and undercuts the photoresist layer, causing it to lose adhesion, lift at the edges, break off, and re-deposit onto the wafer. This results in the loss of otherwise useable die. In addition, if this bead is not removed, it may stick to robotic handlers and transfer photoresist flakes to other tools and other wafers, causing tool downtime and die loss.

In an example of another application of photoresist edge-bead removal using the techniques herein, very thick coatings of 2.5 microns, for example, can be removed without leaving any detectable residue. In this application, a 0.6 mm wide edge bead from the top of the wafer was removed in less than 5 seconds of process time with a laser beam shaped into an elongated ellipse with an aspect ratio of greater than 10:1 and the long axis in the circumferential direction. This permits the laser beam to make a sharp slice into the thick photoresist coating, leaving behind a narrow transition between cleaned and uncleaned photoresist. The characteristics of this transition can be varied by changing the shape and edge profile of the incident laser beam. This photoresist edge bead removal application was carried out on a 200 mm wafer in open atmosphere with 355 nm radiation from the 3rd harmonic of a 12 W Nd:YAG (neodymium-doped yttrium aluminum garnet) laser pulsed at 17 kHz, a 0.1×1.5 mm Gaussian beam with 50% pulse-to-pulse overlap, a peak energy density of 350 mJ/cm$^2$, and a wafer spin rate of 1270 rpm.

In an example of another application, a tri-layer film is removed. This is a film stack that can be designed to minimize the reflections occurring during lithography, thereby permitting higher imaging resolution to produce advanced semiconductor devices. One example is a tri-layer film, successfully removed by the present invention, consists of an organic bottom anti-reflection coating (BARC), a middle silicon ARC layer, and a top layer of photoresist. This tri-layer film stack removal application was carried out on a 300 mm wafer in open atmosphere with 355 nm radiation from the 3rd harmonic of a 12 W Nd:YAG laser pulsed at 15 kHz, a 0.1×1.5 mm Gaussian beam with 50% pulse-to-pulse overlap, a peak energy density of 400 mJ/cm$^2$, and a wafer spin rate of 728 rpm. This process removes 1 mm of width in 8 seconds.

The laser edge-bead removal method and apparatus described herein permits a much better defined and sharper transition zone between removed and unremoved films than can be achieved with prior art using chemicals, plasma, or mechanical methods. More importantly, the ability to create a more sharply defined sidewall in the post-cleaned film provides more silicon area for useable die and can therefore increase die yield on each wafer, which can result in major revenue increases for semiconductor manufacturers.

In another application, a residue of polishing compound slurry is thermally encapsulated. Such residue is the result of a process called chemical mechanical polishing (CMP), used in multiple steps in the fabrication of semiconductor devices. CMP residue consists of unwanted granular particulates from polishing compounds, typically containing cerium oxide, which is harder than silicon. In the prior art, such residue is etched off using a four-step process, using first a mixture of ammonium hydroxide and hydrogen peroxide (SC1), then a mixture of sulfuric acid and hydrogen peroxide (SC2), followed by a de-ionized water rinse and a drying cycle. These mixtures are heated and are highly corrosive, so that special facilities are required, along with protective equipment for operators and special provisions for hazardous waste disposal.

In accordance with the embodiments described herein, one example of a process for removing this polishing residue uses a 3rd harmonic YAG laser delivering an energy density of 1000 to 2400 mJ/cm$^2$ to thermally encapsulate the slurry residue on the wafer edge by melting and re-flowing the silicon surface. This process typically takes 10 seconds to encapsulate 1 mm of the bottom edge of a 300 mm wafer. No corrosive chemicals, water, or drying cycles are required, and there is no hazardous waste as with the prior art methods cited above. In another example the beam is used at a lower energy density to permit the melting of only the areas of the wafer containing the residue while not melting the surrounding silicon surface.

In an example of another application, a post-etch polymer (PEP) residue is removed from the wafer edges. In this example, a reactive ion dry etching step leaves a thin PEP residue as a by-product of the etching process. This residue is extremely difficult to remove due to its chemical nature, being a Teflon-like chlorofluoropolymer. When these residues are present on the bottom side of the wafer, they cause warping of the wafer on a vacuum chuck resulting in image distortion during lithography. In an embodiment, a 1 mm annulus of these residues can be removed in 10 seconds on a 300 mm wafer using a 12 W, 3rd harmonic Nd:YAG laser with an energy density of 500 to 1200 mJ/cm$^2$. The process uses only air as the reactive gas mixture, operates at atmospheric pressure, and does not cause any heat build-up. Further, there is no detectable debris or by-products based on high magnification (150,000×) SEM analysis.

In an example of another application, a copper film is removed from the edge of a 300 mm silicon wafer. This application took 14 seconds per mm of copper removed, and was carried out in open atmosphere with 355 nm radiation from a 12 W, 3rd harmonic Nd:YAG laser pulsed at 22 kHz, a 0.25×0.17 mm Gaussian beam with 75% pulse-to-pulse overlap, a peak energy density of 1000 mJ/cm$^2$, and a wafer spin rate of 60 rpm.

In another application, organic and inorganic particles that are generated during semiconductor processing are removed. Particles from the robotic end effectors, wafer cassettes, ion implantation, or other sources during processing may end up on the wafer edge and need to be removed.

For a wide range of applications, laser energy densities used range from 150 to 2500 mJ/cm$^2$. Although 355 nm radiation, from the 3rd harmonic of a Nd:YAG laser, with a pulse width of 30 to 60 ns, is typically used, other wavelengths and other lasers can also be employed. One example is 532 nm radiation from the 2nd harmonic of a Nd:YAG laser, with 33% lower cost per watt. Alternatively, shorter wavelengths such as 266 nm radiation from the 4th harmonic of a Nd:YAG laser, or 193 nm radiation from an ArF excimer laser can be used to remove more difficult materials such as metals and oxides. Other examples of lasers that can be employed in the present invention include a continuous-wave (CW) argon-ion laser, a pulsed KrF excimer laser, and a 1 to 6 ns pulse-width Yb:YAG laser (ytterbium-doped yttrium aluminum garnet). For a given energy density, a shorter pulse width will result in a higher local, instantaneous substrate temperature. Since this higher temperature increases reactivity, it is advantageous in some applications to use a very short pulse-width laser. In light of the above disclosure, it will now be evident to those skilled in the art that a very wide variety of pulsed and CW, gas and solid-state lasers may be used.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. While the preferred embodiment(s) of the present invention(s) are now shown and described, it is envisioned that those skilled in the art may devise various modifications without departing from the spirit and scope of the appended claims, and it is therefore only the claims that define the legal scope of this invention.

The invention claimed is:

1. An apparatus for processing edges of a substrate, comprising:
    a laser for emitting a laser beam of optical radiation;
    a vacuum chuck for supporting a substrate, the substrate having a top edge, apex edge, and bottom edge;
    a fiber optic input coupler for directing the laser beam into an optical fiber;
    a fiber optic beam delivery assembly, including a fiber optic output coupler disposed to direct optical radiation emitted by the optical fiber along at least three beam paths in a defined order, with
    a first beam path directing optical radiation to the top edge of the substrate;
    a second beam path directing optical radiation to the apex edge of the substrate; and
    a third beam path directing optical radiation to the bottom edge of the substrate,
    the fiber optic beam delivery assembly further arranged such that the first, second, and third beam paths are equal in length; and
    the apparatus thereby removing or transforming films, particles, or residues on each of the top edge, apex edge, and bottom edge of the substrate by application of the optical radiation, and in a single substrate processing step without removing the substrate from the vacuum chuck.

2. The apparatus of claim 1 wherein a wavelength of said laser is between 190 nm and 770 nm.

3. The apparatus of claim 1 wherein the output coupler is fixed in position.

4. The apparatus of claim 1 wherein the output coupler is movable.

5. The apparatus of claim 1 wherein the fiber optic beam delivery assembly further comprises an output coupler that is movable along a track disposed parallel to and equidistant from all-edges of the substrate.

6. The apparatus of claim 1 wherein the output coupler contains lenses.

7. The apparatus of claim 6 wherein the lenses are focusing lenses.

8. The apparatus of claim 6 wherein the lenses are beam shaping lenses.

9. The apparatus of claim 8 wherein the beam shaping lenses contain anamorphic refracting elements.

10. The apparatus of claim 8 wherein the beam shaping lenses contain diffractive optical elements.

11. The apparatus of claim 1 wherein the fiber optic assembly is arranged such that three or more substrate edges are exposed at the same time.

12. The apparatus of claim 1 additionally comprising:
    a cylindrical exhaust tube assembly to remove films, particles or residues resulting from reaction of the optical radiation with the substrate, the cylindrical exhaust tube assembly having a longitudinal slot for enveloping the top edge, apex edge, and bottom edge simultaneously, and thereby preventing films, particles or residues resulting from reaction of the optical radiation from reaching areas of the substrate located away from the edges.

13. The apparatus of claim 1 additionally comprising:
an injector assembly, to direct a fluid to the three or more of the substrate edges being exposed to the laser radiation.

14. The apparatus of claim 1 wherein said apparatus is part of a stand-alone semiconductor wafer edge-processing system.

15. The apparatus of claim 1 wherein said fiber-optic assembly is integrated into a module for use in a semiconductor wafer edge-processing system.

16. A method for processing edges of a substrate comprising:
supporting a substrate on a vacuum chuck, the substrate having a top edge, apex edge, and bottom edge;
delivering a beam of laser radiation via a fiber optic assembly to three or more of a the top edge, apex edge, and bottom edge of the substrate along at least three beam paths in a defined order, by
directing optical radiation to the top edge of the substrate along a first beam path;
directing optical radiation to the apex edge of the substrate along a second beam path; and
directing directing optical radiation to the bottom edge of the substrate along a third beam path,
such that the first, second, and third beam paths are equal in length;
moving the fiber optic and the substrate relative to one another;
delivering a flow of a fluid to the reaction region of the substrate edges while the beam is being delivered to the edges of the substrate;
thereby removing or transforming films, particles, or residues on the top edge, apex edge, and bottom edge, of the substrate in a single substrate processing step without removing the substrate from the vacuum chuck; and
exhausting films, particles or residues of the reaction of the optical radiation and fluid via an exhaust flow provided by positioning a cylindrical exhaust tube to envelope the top edge, apex edge, and bottom edge of the substrate.

17. An apparatus for processing edges of a substrate, comprising:
a vacuum chuck for supporting a substrate, the substrate having a top edge, apex edge, and bottom edge;
a laser for emitting a laser beam of optical radiation at 355 nm;
a fiber coupler for directing the laser beam into an optical fiber;
a beam delivery assembly disposed to direct optical radiation emitted by the optical fiber along at least three beam paths in a defined order, with
a first beam path directing optical radiation to the top edge of the substrate;
a second beam path directing optical radiation to the apex edge of the substrate; and
a third beam path directing optical radiation to the bottom edge of the substrate,
the fiber optic beam delivery assembly further comprising a fiber optic head that is movable along a track that is disposed in parallel to and equidistant from all edges of the substrate such that the first, second, and third beam paths are equal in length;
the apparatus thereby removing or transforming films, particles, or other residues on each of the top edge, apex edge, and bottom edge of the substrate by application of the optical radiation, and in a single substrate processing step without removing the substrate from the vacuum chuck; and
a tube having a longitudinal opening disposed to envelop the top edge, apex edge, and bottom edge of the substrate, and having openings at each end to permit an exhaust flow containing and exhausting removed or transformed films, particles or residues.

18. The apparatus of claim 17 wherein:
the laser emits a laser beam of optical radiation at a wavelength between 190 nm and 770 nm;
the apparatus operates at room temperature;
the tube provides adequate exhaust flow for containing and exhausting the removed or transformed films, particles, or residues; and
an injector assembly to inject a non-reactive fluid into said tube so as to further enhance the removal of films, particles, or residues from the substrate.

19. The apparatus of claim 18 wherein the non-reactive fluid is nitrogen gas.

* * * * *

UNITED STATES PATENT AND TRADEMARK OFFICE
CERTIFICATE OF CORRECTION

PATENT NO. : 8,415,587 B2  
APPLICATION NO. : 13/034202  
DATED : April 9, 2013  
INVENTOR(S) : Millman, Jr. et al.

Page 1 of 1

It is certified that error appears in the above-identified patent and that said Letters Patent is hereby corrected as shown below:

In the Claims:

In col. 15, line 19 should read:  
bly ~~to three or more of a~~ the top edge, apex edge, and In col. 15, line 26 should read:  
~~directing~~ directing optical radiation to the bottom edge of Signed and Sealed this  
Second Day of July, 2013

Teresa Stanek Rea  
*Acting Director of the United States Patent and Trademark Office*